United States Patent [19]
Kemper

[11] Patent Number: 6,131,506
[45] Date of Patent: Oct. 17, 2000

[54] ROASTING PAN

[76] Inventor: Theodore D. Kemper, 110-11 Queens Blvd., Apt. 24N, Forest Hills, N.Y. 11375

[21] Appl. No.: 09/349,911

[22] Filed: Jul. 8, 1999

[51] Int. Cl.[7] .............................. A47J 37/10; A47J 27/00
[52] U.S. Cl. .................. 99/425; 99/445; 99/446
[58] Field of Search ............................ 99/400, 425, 444, 99/445, 446; D7/354, 323, 359, 409; D9/424, 428

[56] References Cited

U.S. PATENT DOCUMENTS

| | | | |
|---|---|---|---|
| D. 288,055 | 2/1987 | Alexander | D7/354 |
| D. 359,879 | 7/1995 | Fielding et al. | D7/354 |
| D. 359,880 | 7/1995 | Fielding et al. | D7/409 |
| D. 387,949 | 12/1997 | Bentson | D7/409 |
| D. 392,884 | 3/1998 | Hayes | D8/431 |
| 2,569,262 | 9/1951 | Sklavenitis | 99/426 |
| 2,673,003 | 3/1954 | Stewart | 220/72 |
| 2,772,627 | 12/1956 | Newell | 99/425 |
| 3,536,000 | 10/1970 | Whitehill | 99/425 |
| 3,648,209 | 3/1972 | Wilson | 99/446 |
| 3,958,504 | 5/1976 | Levin | 99/426 |
| 4,121,510 | 10/1978 | Frederick | 99/425 |
| 4,140,889 | 2/1979 | Mason, Jr. et al. | 99/444 X |
| 4,186,217 | 1/1980 | Tchack | 426/523 |
| 4,616,762 | 10/1986 | Alexander | 220/74 |
| 4,817,812 | 4/1989 | Sarnoff et al. | 220/85 |
| 4,848,217 | 7/1989 | Koziol | 99/426 |
| 4,852,760 | 8/1989 | Sarnoff et al. | 220/85 |
| 4,969,569 | 11/1990 | Anders | 220/69 |
| 5,029,721 | 7/1991 | Timpe | 220/94 |
| 5,310,977 | 5/1994 | Stenkamp et al. | 219/730 |
| 5,503,062 | 4/1996 | Buff, IV | 99/426 |
| 5,878,656 | 3/1999 | Fletcher et al. | 99/340 |

*Primary Examiner*—Reginald L. Alexander

[57] ABSTRACT

A roasting pan for large food items and a support structure. The roasting pan comprises a bottom wall with front, rear, and side walls rising from the perimeter of the bottom wall. The pan is shaped to conform with and fit into the support structure. The pan includes a number of hollow, upward-extrusions or ribs rising from the bottom wall. These hollow upward-extrusions mate with and seat the pan securely upon a similar number of shoulders rising from support members in the support structure. A roasting food-item sits on the upper surface of the hollow upward-extrusions well-elevated above the bottom wall of the pan and above run-off fat and cooking liquids. The bottom wall of the pan slopes downward and inward from rear to front to form a V-shaped channel to carry run-off fat and cooking liquids downward and forward into a sump or well where these are collected and isolated and are accessible by brush or basting tube. The support structure is configured to accommodate and provide support for the downward and inward slope of the bottom wall of the pan and the V-shaped channel.

11 Claims, 5 Drawing Sheets

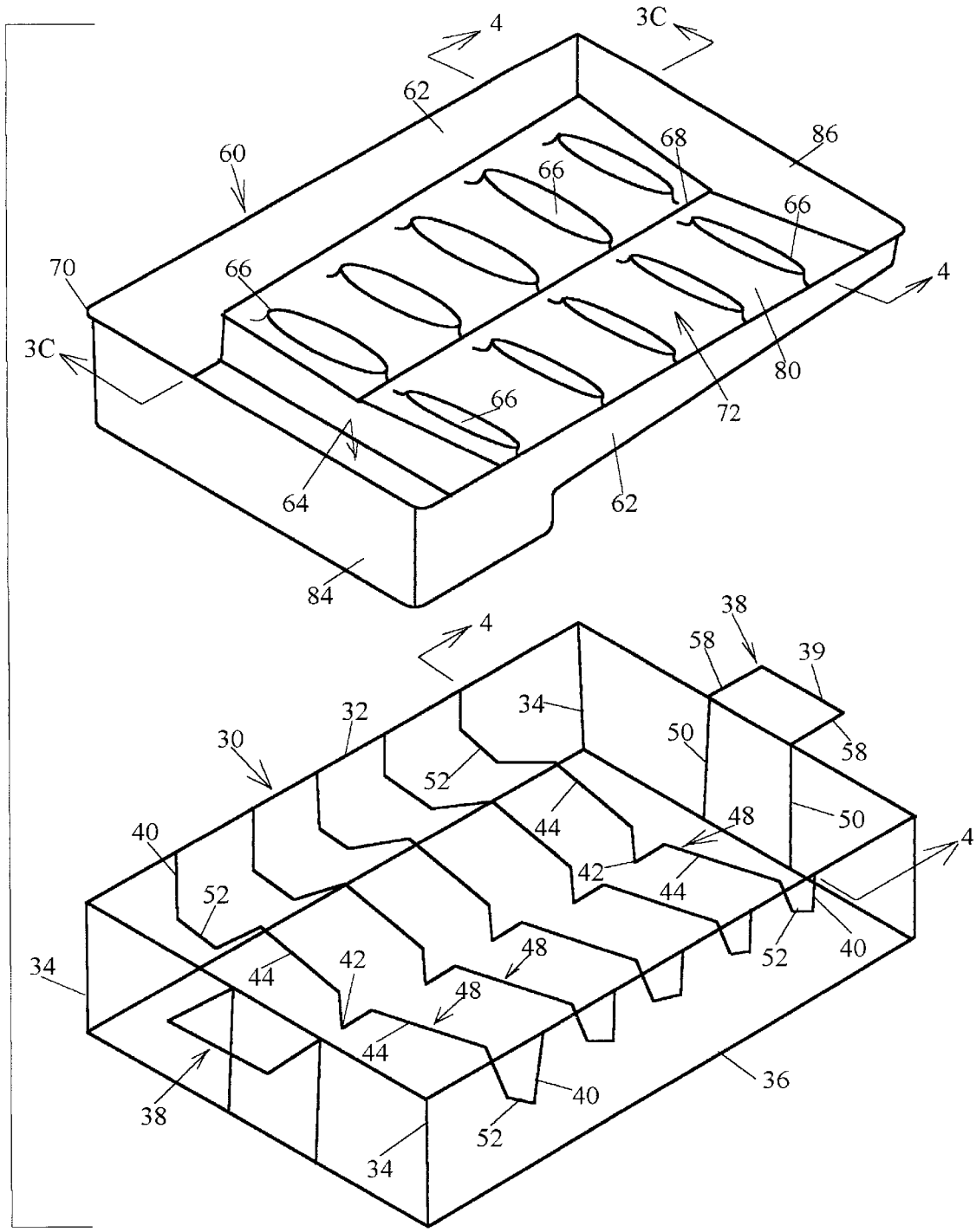

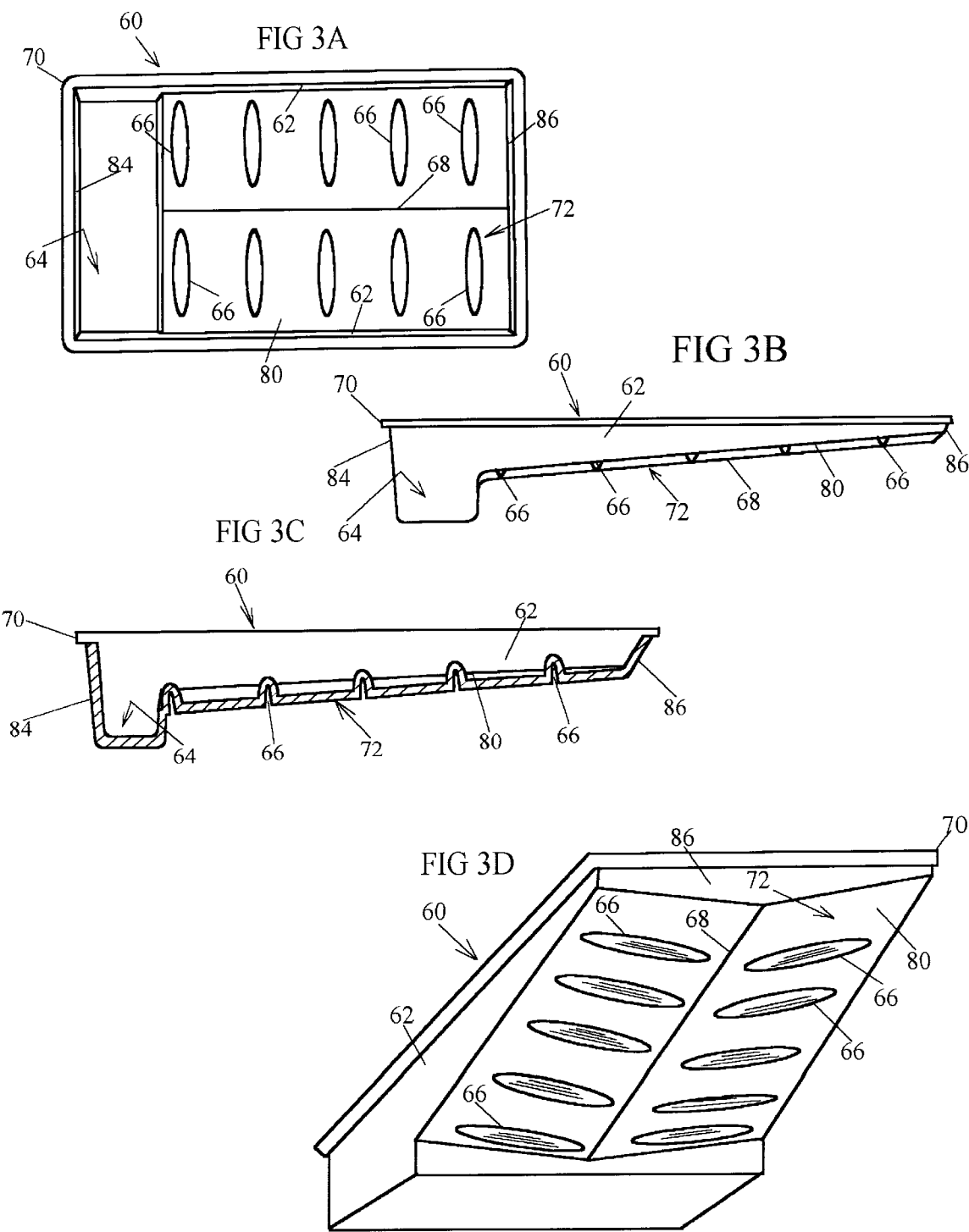

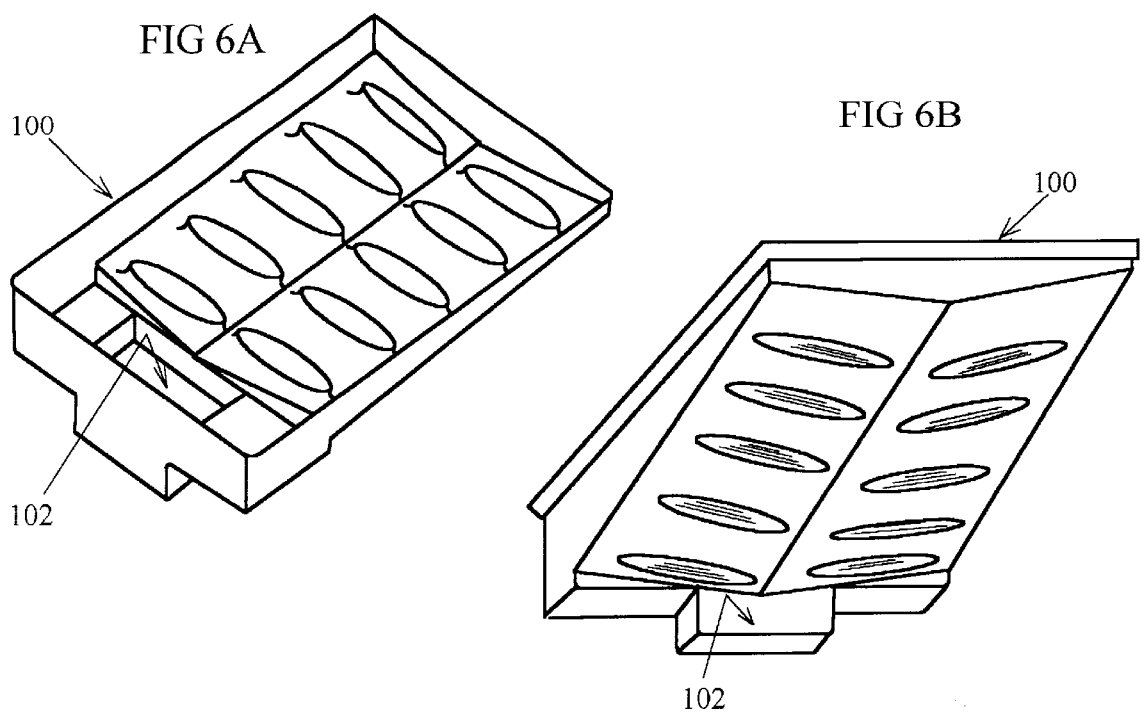

ROASTING PAN

CROSS-REFERENCE TO RELATED APPLICATIONS

Not Applicable

BACKGROUND

1. Field of Invention

This invention relates to cooking ware, particularly a pan for roasting large food items.

2. Description of Related Art

In the matter of roasting large comestibles such as turkeys, beef roasts, loins, and other large cuts of meat, prior art teaches two main approaches. The first entails a wire rack on which the roasting food sits elevated above a holding pan which collects run-off fat and cooking liquids, for example, U.S. Pat. No. 4,848,217 to Koziol (1989). The second approach entails a disposable pan of light-weight metal, such as thin-gauge aluminum, wherein the roasting food sits on the bottom of the pan, for example, U.S. Pat. No. 4,969,569 to Anders (1990). Each approach is marked by disadvantages both particular and common.

The rack-and-pan approach keeps the food well above the fat and juices, allowing for a healthful and evenly roasted product. But it requires the inconvenience and labor of thoroughly washing both rack and pan. Even when the rack and pan are coated with non-stick material, the task of thoroughly cleaning the rack and pan remains.

Although the disposable pan approach offers the advantage of minimal clean-up and avoids the potential health hazard of hard-to-eliminate food remaining in the creases between the rack ribs and the rack frame, it suffers from the health disadvantage that the roasting food sits in the run-off fat and results also in only partial roasting of the bottom of the food. In order to solve these problems, U.S. Pat. No. 3,958,504 to Levin (1976) attempts to create the equivalent of rack-like elevations by means of bosses or other extrusions above the planar bottom of the pan. But these efforts create only a poor simulacrum of a true rack, since the thin aluminum that allows for the disposability and low cost of the pan, does not allow for bosses or other elevations to be high enough to create a rack that spaces the food well above the fat. U.S. Pat. No. 3,640,209 to Wilson (1972) segregates a cooking item from run-off fat, but is limited to the process of broiling. This method entails relatively light-weight, flat cuts of meat, such as steaks, chops, or hamburger, for which a flat cooking surface is adequate and may be accommodated by a thin-gauge disposable pan. Roasting, on the other hand, entails relatively large, heavy, and ovoid fowl or meats such as turkeys or roasts. These do not easily rest stably on a flat surface to present an optimum orientation for cooking, for example, breastdown when roasting a turkey. U.S. Pat. No. 5,503,062 to Buff (1996) provides a nondisposable frame for supporting a roasting item elevated above run-off fat in a disposable pan, but requires thorough washing and cleaning, thus limiting the convenience of this approach. U.S. Pat. No. 4,186,217 to Tchack (1980) requires laying down a sheet of very thin-gauge flexible metal foil by hand, with the attendant inconvenience and potential problems of puncturing and tearing that are attendant on working with very thin-gauge, flexible foil.

An additional disadvantage of the disposable pan is that the thin-gauge aluminum that enables low cost and disposability is not strong enough to hold food of more than 20 to 25 pounds. This creates a potentially dangerous situation when the pan is lifted, thus often requiring two persons to lift it, or placing the pan on a portable rigid surface such as a cookie sheet to prevent buckling. In order better to support a heavy food item, pans rely on special reinforcement of pan sides and edges, for example, as provided for in U.S. Pat. No. 4,616,762 to Alexander (1986). But even with crimping to reinforce side walls and strengthening of the rim, pans containing heavy food items must still be placed on possibly heavy rigid sheets to prevent the pan from buckling when lifted. When the pan must be moved, this creates a potential hazard of the pan slipping to the floor, since it is not secured to the rigid sheet.

A further disadvantage of the disposable-pan approach is that because, in order to maintain maximum stability and prevent sliding, the food item must be placed in the pan with its broadest side seated on the bottom of the pan, the disposable pan method does not permit cooking a food product such as a turkey on its side or in the breast-down position, as recommended by various authorities, for example, the popular "Fanny Farmer Cookbook," or "The Joy of Cooking." The latter goes so far as to recommend the off-hand and chancy practice of crushing aluminum foil into balls to wedge along the bottom edge of a turkey if it does not lie stably in a flat-bottom pan.

In addition to the separate disadvantages of the rack-and-pan and the disposable-pan approaches, they share further disadvantages in common. One is the potential of upsetting the pan through the shifting of a heavy food item, with the danger not only of spilling the food item to the floor, but of burning oneself during such an accident. When the pan holding a rack is lifted or tilted, the rack may slide from one position in the holding pan to another. This is even more likely when rack and pan are both treated with non-stick coating, because the coating itself inhibits surface friction, thus facilitating sliding of one such surface, the feet of the rack, on another such surface, the bottom of the pan.

Similarly, food lying free on the bottom of a disposable pan, unconstrained by a rack, may shift or roll any time the pan is lifted or tilted. The danger of upsetting either a pan containing a rack or a disposable pan becomes especially acute when there is a need to baste the food. For purposes of basting, a basting brush can collect accumulated fat and juices and then deposit these on the food. This may require lifting and/or tilting the pan in order to get at these patches of fat and juice or to create a deep pool at one end of the tilted pan, thus incurring the potential of upsetting the pan through the shifting of the rack or the food item itself in the disposable pan.

In an alternate basting method, a device consisting of a hollow-tube with a tapered point and capped by a rubber bulb is used for basting. Squeezing the bulb and slowly releasing it creates a partial vacuum that sucks basting liquids into the tube. Squeezed again, the tube releases its liquids. Since the tube-and-bulb baster has more capacity than a brush, there is a natural desire to use this capacity. The basting tube method entails potential danger in the need to tip the pan significantly in order to create a sufficiently deep pool of liquids to enable one to take advantage of the large capacity of the basting tube. This danger is more pronounced in the case of the disposable pan because of its less rigid structure, which allows for bending and buckling, regardless of structural features designed to avoid this.

Yet another disadvantage common to any method where a pan is used either to contain a rack, or alone, as a disposable pan, is that basting liquids normally spread over the entire bottom surface of the pan. This exposes a maximum surface of the liquid to heat and thus to evaporation, reducing the amount available for basting and exacerbating the problems entailed in basting, as indicated above.

U.S. Pat. No. D359,880 to Fielding and Adams (1995), attempts to solve the basting problem by attaching a conducting channel for fat and cooking liquids to a small basting-well located at one end of a rack. This rack must be placed in a pan, since there is significant overflow beyond the confines of the conducting channel and out of the basting-well itself, leading to a problem of clean-up of both rack and pan. U.S. Pat. No. D359,879 to Fielding and Adams (1995) incorporates a basting-well in the bottom wall of a roasting pan, requiring, however, a doubling of the front, side, and rear walls of the pan in order to accommodate the basting well, thus increasing cost but without providing a true rack-like interior to maintain roasting food elevated well-above run-off fat, nor a basting well deep enough to accommodate run-off fat without significant overflow and thus leading the food item to sit in the overflow, nor, given the requirements of structural integrity of such a construction, disposability.

U.S. Pat. No. 5,878,656 to Fletcher et al. (1999) affords a plurality of separate recesses for collecting run-off fat and cooking liquids in the bottom of the pan, thus making basting a cumbersome process by virtue of the fact that the food item sits directly above the these recesses and must be shifted, lifted, or tilted aside before a brush or basting tube can gain access to the liquids in the recesses. The multiplicity of basting recesses makes cumbersome too pouring off fat and gravy after the food item has been removed from the pan at the end of the cooking process. In sum, both approaches to roasting large food items are fraught with both particular and common disadvantages. No presently available device entailing either the rack-and-pan or disposable-pan approach combines the elements of providing for: a) roasting food to sit well-elevated above run-off fat; b) secure placement of a large food item in any orientation for roasting; c) efficient collection of fat and cooking liquids for basting; d) providing a safe and energy-efficient basting method; and e) disposability. The disclosed invention accumulates the particular advantages of each approach, avoids both the several particular and common disadvantages of the two approaches, and adds advantages available to neither of the two approaches.

SUMMARY

In accordance with the present invention, a roasting pan wherein roasting food may be disposed in any desired orientation and may sit in the pan elevated above run-off fat and configured to contain a well for collecting fat and cooking liquids for safe and efficient basting of food that is roasting in the pan and is also disposable.

OBJECTS AND ADVANTAGES

In accordance with the objects and advantages of the roasting pan described in my above patent, several objects and advantages of the present invention are:

(a) to provide a disposable pan that allows large food items to be roasted on a rack-like configuration;

(b) to provide a disposable pan wherein roasting food sits entirely above run-off fat, thus allowing healthful and even roasting of large food items;

(c) to provide a disposable pan for roasting very heavy food items without the need for special reinforcement of the pan;

(d) to provide a disposable pan that does not require an unsecured and potentially hazardous tray to support it lest it buckle;

(e) to provide a disposable pan in which a heavy food item resting in the pan is unlikely to shift position dangerously during any normal movement of the pan;

(f) to provide a disposable pan in which a large food item such as a turkey can be roasted in any position deemed desirable, whether on its side, breast-up, or breast-down;

(g) to provide a disposable pan that is stable and secure and requires no tilting for any purpose;

(h) to provide a disposable pan that minimizes evaporation of basting liquids;

(i) to provide a disposable pan that enables efficient basting, thus conserving oven temperature and facilitating thorough cooking;

(j) to provide a disposable pan that contains a deep basting well in which to collect fat and liquids for easy access by either a basting brush or basting tube;

(k) to provide a disposable pan that enables basting to be accomplished without the need to tilt the pan in a potentially dangerous way.

Further objects and advantages of my invention will become apparent from a consideration of the drawings and ensuing description.

DRAWING FIGURES

In the preferred embodiment:

FIG. 1 shows an exploded view from above of a rectilinear-shaped pan and a rectilinear-shaped support structure in perspective.

FIG. 3A shows a rectilinear-shaped pan in a top view.

FIG. 3B shows a rectilinear-shaped pan in side view.

FIG. 3C shows a rectilinear-shaped pan in a side section-view.

FIG. 3D shows a rectilinear-shaped pan from the rear and below in a perspective view.

FIG. 6A shows a rectilinear-shaped pan with a narrow basting-well in perspective view from above.

FIG. 6B shows a rectilinear-shaped pan with a narrow basting-well in perspective view from the rear and below.

Figure 2A:
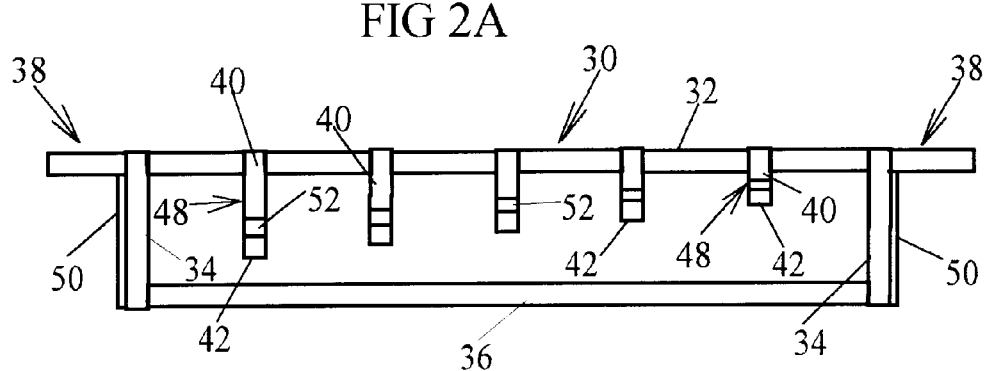
FIG. 2A shows a rectilinear-shaped support structure in a side view.
Figure 2B:
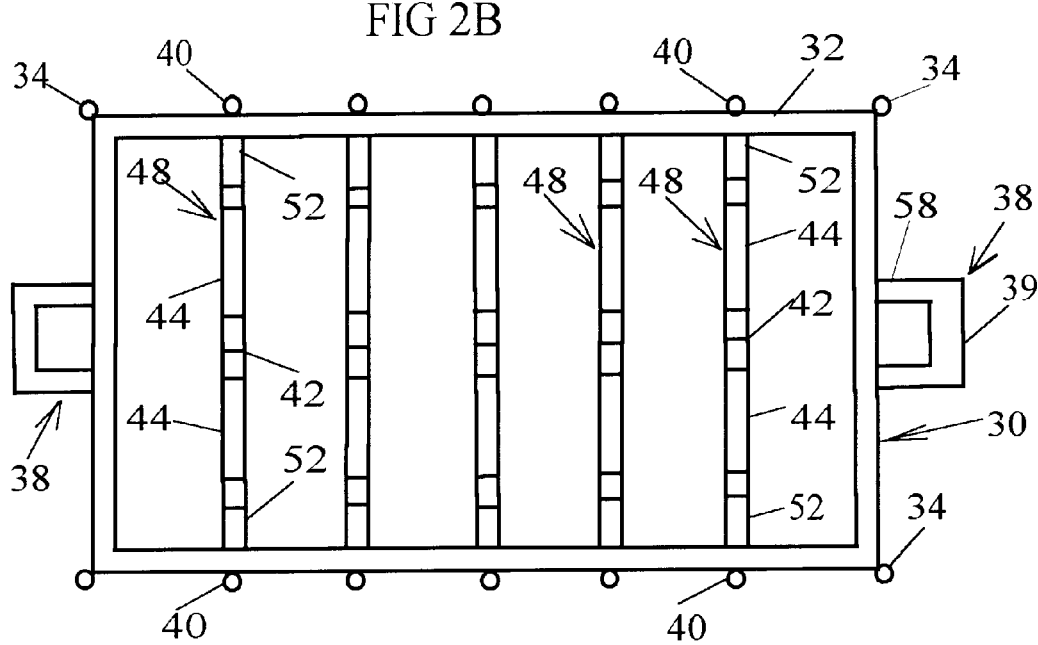
FIG. 2B shows a rectilinear-shaped support structure in a top view.
Figure 2C:
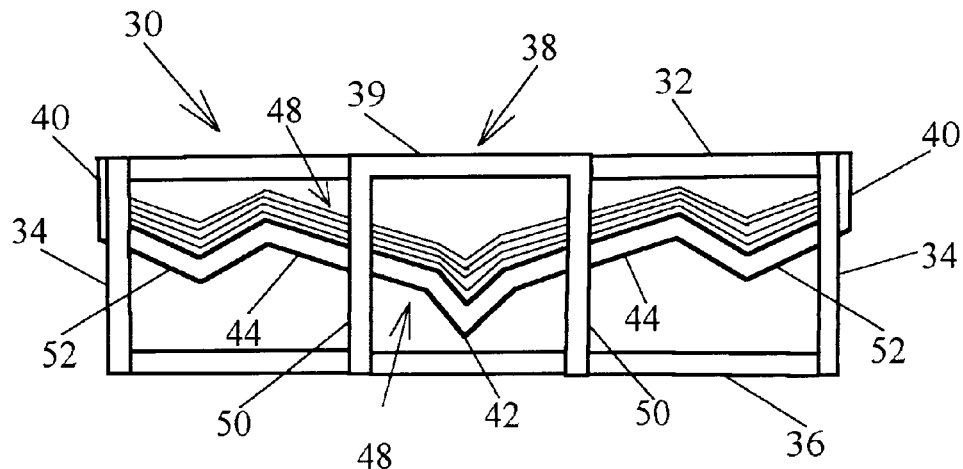
FIG. 2C shows a rectilinear-shaped support structure in an enlarged front view.

REFERENCE NUMBERS IN DRAWINGS 20 pan of alternate embodiment
25 basting well of pan 20
30 wire rack of preferred embodiment
32 upper frame of rack 30
34 connecting strut of rack 30

36 lower frame of rack 30
38 handle of rack 30
39 grip of handle 38
40 vertical descending member of support member 48
42 vertex of support member 48
44 shoulder of support member 48
48 V-shaped support member of rack 30
50 brace of handle 38
52 traveling member of support member 48
58 side bar of handle 38
60 pan of preferred embodiment
62 side wall of pan 60
64 basting well of pan 60
66 hollow upward-extrusion
68 V-notch of bottom wall section 80
70 lip of pan 60
72 bottom wall of pan 60
80 rear section of bottom wall 72
84 front wall of pan 60
86 rear wall of pan 60
90 rack of an alternate embodiment
92 pan of an alternate embodiment
94 shoulder of support member 97
96 hollow upward-extrusion of pan 92
97 V-shaped support member of rack 90
98 basting well of pan 92
100 pan of an alternate embodiment
102 basting well of pan 100

DETAILED DESCRIPTION

In the preferred embodiment, FIG. 1 shows a rack 30 and a pan 60 in combination wherein pan 60 is understood to fit conformably into rack 30. FIGS. 1 and 2A–2C show rack 30 as a wire, rectangular upper-frame 32 connected to a wire, rectangular, lower-frame 36 of essentially similar dimensions by connecting struts 34, which attach rigidly through welding or other means to the corners of upper frame 32 and lower frame 36 to create a stable rack.

As seen in FIGS. 1 and 2A–2C, a plurality of parallel, wire, spaced-apart, V-shaped support-members 48 are attached at each end by welding or other means at predetermined points to the long sides of upper frame 32. As seen also in an enlarged section view in FIG. 4, V-shaped support-member 48 includes a pair of approximately vertical descending members 40. These are attached at the upper ends to upper frame 32. At the lower end of vertical descending members 40, support member 48 bends upward less than 90-degrees to form a pair of traveling members 52, from which, at predetermined points, support member 48 bends upward to form a pair of shoulders 44 of predetermined length, after which support member 48 bends slopingly downward to culminate in a V-shaped notch or vertex 42. In all respects, each side of any given V-shaped support member 48 is a mirror image of the other side.

It will be noticed further in FIG. 2A that the vertical descending members 40 of support members 48 are of unequal length. Support members 48 differ from each other solely in the length of their pairs of vertical members 40. Support member 48 with the shortest pair of vertical descending members 40 is positioned rearmost in rack 30, with support members 48 having progressively longer pairs of vertical descending members 40 positioned nextmost forward in sequence until all are placed, thus allowing for a uniform descending path of vertices 42, as shown in FIGS. 2A and in an enlarged front view in FIG. 2C. It can be seen that vertex 42 of the forwardmost support member 48 is spaced apart and above the plane of the bottom frame 36 of rack 30. This allows for a sump or well, to be described below, when pan 60 is seated in rack 30.

It will be seen in FIGS. 1, 2A–2C that a centrally-positioned wire-handle 38 attaches to, and extends outward from, the short sides of upper rectangular-frame 32. In the preferred embodiment, handle 38 consists of a single piece of wire secured rigidly by welding or other means at each of its ends to the short sides of lower rectangular-frame 36. Handle 38 then rises upward in parallel from such points of attachment to form a pair of braces 50 which attach securely by welding or other means to the short sides of upper frame 32 and then turn downward at a 90-degree angle to form sidebars 58 of the handle and bend inward in the same plane to form a grip 39 of handle 38. In another embodiment, braces 50 extend continuously upward from their point of attachment to upper frame 32 and join grip 39 to form an inverted U-shaped handle.

It will be seen in FIGS. 1, 3A and 3D that pan 60 in the preferred embodiment comprises an essentially rectangular container having a bottom wall 72, a front wall 84, a rear wall 86, and side walls 62 and is dimensioned to fit conformably into rack 30. The continuous upper periphery of front wall 84, rear wall 86, and side walls 62 is shaped in a manner to form a lip 70. As may be seen in FIGS. 1 and 4, lip 70 is designed to rest on upper rectangular-frame 32 when pan 60 is set into rack 30.

Figure 4:
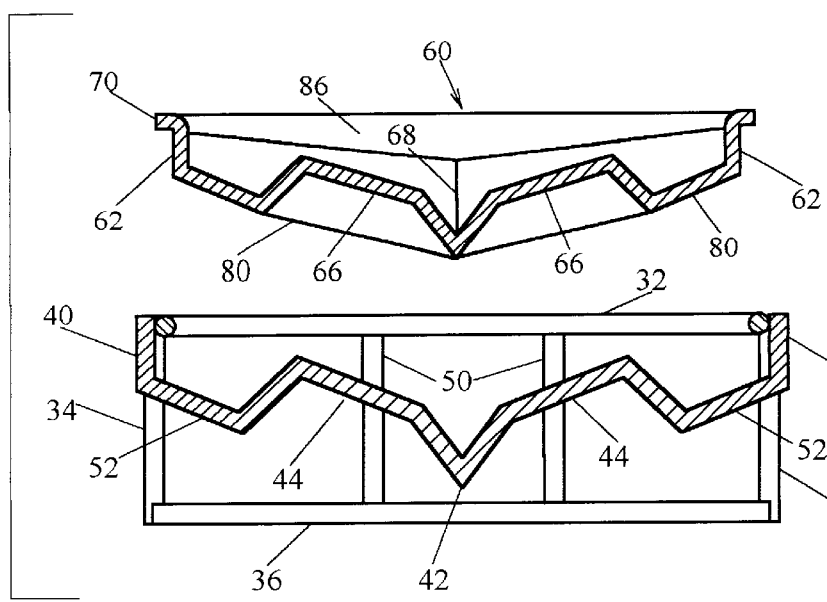
FIG. 4 shows an exploded, enlarged front section-view of a pan with a pair of hollow upward-extrusions and a V-shaped support member attached to the upper frame of a rectilinear-shaped support structure.

It will be seen in FIGS. 3B and 3D that rear section 80 of bottom wall 72 slopes downward from rear wall 86 and that it further slopes inwardly downward from both sidewalls 62 to form a descending V-shaped notch, or vertex 68, that conforms in depth and angle to the descending path of the vertices 42 of support members 48 of rack 30, as well as the depth and angle of the downward sloping sides of support members 48. It will be seen further in FIGS. 1 and 3A–3D that section 80 of bottom wall 72 has a plurality of pairs of parallel, spaced-apart, hollow upward-extrusions 66 of a height, length, and width approximating the height, length, and width of the shoulders 44 of support members 48 of rack 30. As seen in FIGS. 1 and 4, when pan 60 is placed into rack 30, the hollow upward-extrusions 66 mate with, and allow pan 60 to sit conformably and securely on, the shoulders 44 of support members 48. It will be seen further in FIG. 4, which shows an enlarged section of pan 60 and rack 30, that vertex 68 of bottom wall section 80 nestles into and rests upon vertices 42 of support members 48. It will also be seen in FIG. 4 that the angle of descent of bottom wall 80, from where it joins side wall 62 to the beginning of hollow upward-extrusions 66, is conformable with the angle of descent of traveling member 52 of support member 48 and allows this section of bottom wall 80 to rest on traveling member 52. Substantially, bottom-wall section 80 has a plurality of points of contact with support members 48, thus enabling pan 60 to rest stably and securely in rack 30.

It will be seen in FIGS. 1 and 3A–3D that forward of the forwardmost pair of hollowupward-extrusions 66, bottom wall 72 descends to form a sump or well that occupies the width of the frontmost section of pan 30, which well is designed to isolate and contain run-off fat and cooking liquids and function as a basting well, easily accessible to a basting tube or brush. The total effect of this configuration of pan 60 is to enable pan 60 to sit stably and securely inside rack 30 while a roasting item sits elevated on the outer top-surface of the plurality of pairs of parallel, spaced-apart, hollow upward-extrusions 66, and elevated above run-off fat and cooking liquids which flow down the sloping path of continuous V-shaped notch 68 to collect in basting well 64.

Although the preferred embodiment entails an elongated, rectangular-shaped rack and pan, it is to be understood that alternate shapes, such as oval or circular or square provide the same functionality as described for the preferred embodiment.

Figure 5A:
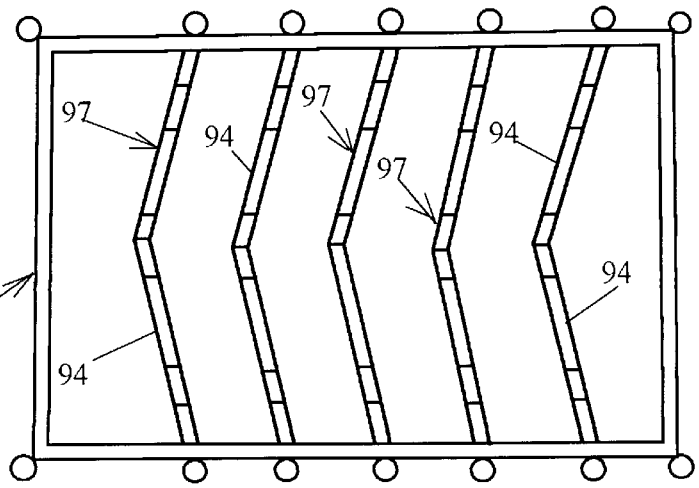
FIG. 5A shows a rectilinear-shaped support structure with forward-angled V-shaped support-members in top view.
Figure 5B:
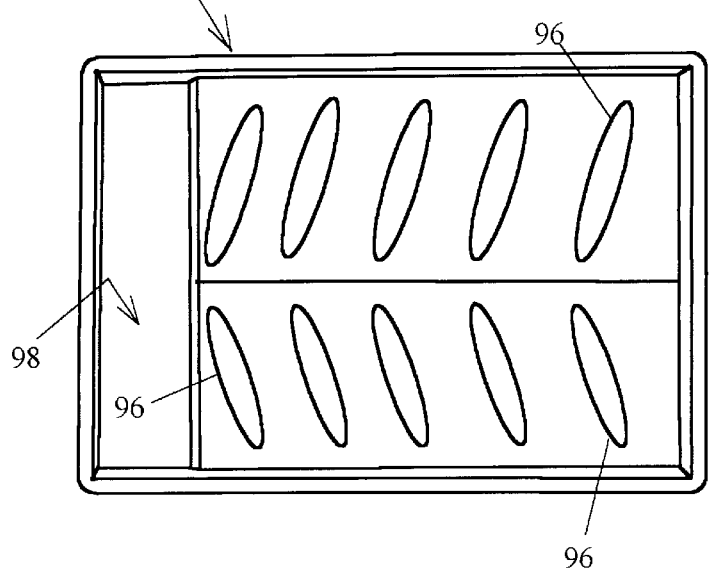
FIG. 5B shows a rectilinear-shaped pan with forward-angled pairs of hollow upward-extrusions in a top view.

In another alternate embodiment, FIGS. 5A and 5B show a rack 90 in combination with a disposable pan 92 wherein rack 90 is configured in all details like rack 30 in the preferred embodiment, with the exception that a plurality of parallel, spaced-apart, support members 97 of rack 90, the functional equivalents of support members 48 of rack 30 in the preferred embodiment, are angled forward to form a V-shaped configuration or herringbone pattern pointing frontward when observed from above. It will be appreciated that the configuration of rack 90 is designed to supply substantially the same functionality as rack 30 in the preferred embodiment.

As can be seen in FIG. 5B pan 92 is configured in all details like pan 60 in the preferred embodiment, with the exception that a plurality of pairs of parallel, spaced-apart, hollow upward-extrusions 96, the functional equivalents of hollow upward-extrusions 66 in the preferred embodiment of pan 60, and are angled forward and form a V-shaped configuration or herringbone pattern pointing frontward when observed from above. Hollow upward-extrusions 96 are configured as to height, length, and width so as to mate with and rest conformably and securely on shoulders 94 of support members 97 when pan 92 is set into rack 90. It will be appreciated that the configuration of pan 92 is designed to provide substantially the same functionality as pan 60 in the preferred embodiment. The differential effect of such an angular configuration of support members 97 of rack 90 and such angular configuration of hollow upward-extrusions 96 of pan 92 is to facilitate the forward flow of run-off fats and cooking liquids to be collected in basting well 98.

In yet another alternate embodiment, it will be seen in FIGS. 6A–6B, pan 100 is seen to be identical with pan 60 except with respect to the size and location of its sump or well 102 which is located only in a central portion of the width at the front of the pan. This has the effect of creating a deeper pool of fat and cooking liquids for basting than well 64, which extends across the entire front end of pan 60 in the preferred embodiment, as shown in FIGS. 1 and FIGS. 3A–3D.

It will be appreciated that in the preferred and several alternate-embodiments presented above, pans 60, 92, and 100 may be constructed of thin-gauge metal foil, e.g., aluminum, to create a disposable pan, or alternatively of heavy-gauge metal, e.g., aluminum, to create a permanent pan. A permanent pan of these types may be coated with non-stick material.

In yet another alternate embodiment, pan 92 and rack 90, seen in FIGS. 5A–5B, are oval or otherwise nonrectilinear in shape.

It will be seen that in the present invention there is now provided a pan and support structure in preferred and alternate embodiments that can accommodate a variety of large food items for roasting. The pan and support structure in combination provide a stable and secure device that permits roasting turkeys, beef roasts, and the like, in a healthy manner, with the food item resting well-above run-off fat, and containing a substantial well for the collection of run-off fat and cooking liquids. The fat and cooking liquids are easily accessible, requiring no potentially dangerous tilting of the pan for purposes of basting, thus allowing for even roasting while at the same time conserving oven temperature.

The foregoing invention can now be practiced by those skilled in the art, such skilled persons will know that the invention is not necessarily restricted to the particular embodiments presented herein. The scope of the invention is to be defined by the terms of the following claims as given meaning in the preceding description.

I claim:
1. A roasting pan comprising
   a) a pan
      1) having a bottom wall and, upstanding from said bottom wall, a front wall, a rear wall, and two opposite side-walls, forming a generally elongated, rectangular shape,
      2) said pan further having a plurality of pairs of parallel, spaced-apart, hollow upward-extrusions, or ribs, sufficient in number, width, length, and height above said bottom wall, and positioned at predetermined locations in said bottom wall and projecting above an inner surface of said bottom wall, and so dimensioned as to enable any roasting food item to rest on said upward extrusions or ribs, and spaced apart from, said inner surface of said bottom wall,
      3) wherein said bottom wall having a downward slope at a predetermined angle from said rear wall toward said front wall and said bottom wall also having a downward slope inward at a predetermined angle from said two opposite side-walls forming a downward sloping V-shaped channel along which run-off fat and cooking liquids may descend forwardly, and
      4) further having said channel proceed until a point approximately just forward of the forwardmost of said pairs of parallel, spaced-apart, hollow upward-extrusions, whereupon said bottom wall descends vertically to form a sump or well in a space between said vertically descending bottom wall and said front wall of said pan, and into which said run-off fat and cooking liquids flow and where they are isolated and collected, and
   b) a support structure
      1) in combination having a front side, a rear side, and two opposite-sides forming a generally elongated, rectangular-parallelepiped shape, and further having means to contain said pan inside said support structure, and
   whereby said pan is located and stably supported in said support structure, and
   whereby a food item cooking in said pan and resting upon said upward extrusions is healthily elevated above said run-off fat and cooking liquids, and
   whereby said run-off fat and cooking liquids are isolated and deposited in said well occupying a delimited portion of said pan, and
   whereby said run-off fats and liquids from the cooking food are easily accessible in said well for the purpose of efficient basting without potentially dangerous tilting of said pan, and
   whereby said basting can be done without keeping the oven door open excessively.
2. The roasting pan of claim 1 wherein said means to contain said pan inside said support structure include
   a) an open wire-rack having an upper frame and a lower frame of approximately equivalent dimensions and having said upper frame and said lower frame joined by a plurality of connecting struts at predetermined points, and having a generally elongated, rectangular-parallelepiped shape, and having dimensions to contain said pan snugly and securely within said rack and
   b) said rack

1) further having a plurality of parallel, spaced-apart, V-shaped support-members, said V-shaped support-members having pairs of vertical descending-members, and having said vertical descending-members attached at predetermined points to the two long-sides of said upper frame of said rack, and having said predetermined points of attachment aligned with the locations of said plurality of pairs of parallel, spaced-apart, hollow upward-extrusions of said pan when said pan is inside said rack, and 2) said V-shaped support-members having a pair of elevated shoulders of predetermined height and length at predetermined positions along the downward sloping sides of said V-shaped support-members, and having said shoulders so aligned along said sloping sides of said V-shaped support-members so as to allow said plurality of pairs of parallel, spaced-apart, hollow upward-extrusions of said pan to mate snugly with and seat stably and securely upon said shoulders of said plurality of V-shaped support-members of said rack when said pan is set into said rack, and 3) having said V-shaped support members culminate in a V-shaped notch or vertex, and 4) said pairs of vertical descending-members having a predetermined variable length, having said vertical descending members attached to said upper frame in sequence so as to impart a uniform downward slope to the vertices of said V-shaped support-members from the rear to the front of said rack, and said vertices having a downward slope conformable with said downward sloping V-shaped channel in said bottom-wall of said pan, so as to allow said V-shaped channel to rest securely and stably on said plurality of downward sloping vertices of said V-shaped support members of said rack, and whereby said means provide for said pan to rest upon and be in contact with said rack and said V-shaped support-members at a plurality of points, including at least said plurality of hollow upward-extrusions of said pan on said shoulders of said V-shaped support members of said rack, and said V-shaped channel of said pan on said vertices of said V-shaped support-members of said rack, and whereby said plurality of points of contact assure that said pan rests stably and securely inside said rack.

3. The roasting pan of claim 1 wherein said plurality of parallel, spaced-apart, hollow upwardextrusions of said pan are dimensioned so as to elevate a roasting food item at least one half inch above said bottom wall of said pan.

4. The roasting pan of claim 1 wherein said pan is made of thin-gauge metal, e.g., aluminum, thereby affording disposability.

5. The roasting pan of claim 1 wherein said plurality of pairs of parallel, spaced-apart, hollow upward-extrusions of said pan are angled forward by a predetermined amount to form a V-angled shape or herringbone pattern when said plurality of upward extrusions are viewed from above.

6. The rack of claim 2 wherein said plurality of V-shaped support-members of said rack are angled forward by a predetermined amount to form a V-angled shape or herringbone pattern when said plurality of V-shaped support members are viewed from above.

7. The rack of claim 2 wherein said rack has a handle attached to each long-end of said rack.

8. A roasting pan and support structure in combination comprising a) a pan
1) having a bottom wall, a front wall, a rear wall, and two opposite side-walls rising approximately vertically from the periphery of said bottom wall, and having a generally elongated, rectangular shape, and 2) the upper periphery of said front wall, said rear wall, and said two opposite side walls having an outward-turned lip, and 3) said lip having a parallel relation with any flat surface when said front wall and said rear wall are both approximately perpendicular to said flat surface, and 4) having said rear-wall shorter than said front wall, and 5) said bottom wall having a plurality of pairs of parallel, spaced-apart, hollow upward-extrusions of predetermined length, height and width, located at predetermined points along said bottom wall and having the top of said upward extrusions spaced apart from said bottom wall, and 6) having said bottom wall slope downward from said rear wall and slope inwardly downward from said two opposite side-walls on a uniform descending slope frontward, and having said inward, downward slope comprise a V-shaped channel, and 7) having said bottom wall just forward of said forwardmost pair of upward extrusions descend approximately vertically, and 8) having said vertical section of said bottom wall form a rear side of a sump or well, and having a lower portion of said front wall form a front side of said well, and having lower portions of said two opposite side walls that lie between said front wall and said vertical section of said bottom wall form side sections of said well, and having a horizontal portion of said bottom wall forward of said vertical descending section of said bottom wall form a bottom wall of said well, and b) a support structure comprising
1) a wire rack having an upper frame and a lower frame of a generally elongated, rectilinear shape, and said rack having a plurality of connecting struts rigidly attached at predetermined positions to said upper frame and said lower frame, and 2) said rack having a plurality of V-shaped support members attached at each end at predetermined points to said upper frame of said rack, and 3) said V-shaped support members including a pair of vertical descending members, a pair of traveling members turned inward at a predetermined angle from said vertical descending members, and a pair of elevations or shoulders of predetermined height, length, and width, and having said shoulders culminate in a V-shaped notch or vertex, and 4) having said vertical descending members vary in length so that when said V-shaped support member with the shortest pair of vertical descending members is positioned rearmost, and said V-shaped support members with longer pairs of said vertical members are positioned in sequence frontward, said vertices of said V-shaped support members describe a uniform descending path, and 5) having a pair of handles, one of said handles attached to each long end of said rack, and whereby said pan fits conformably inside said rack, and said lip seats upon and rests continuously upon said upper frame of said rack, and said hollow upwardextrusions mate with and seat upon said shoulders of said V-shaped support members of said rack, and said descending V-shaped channel of said pan seats upon and rests upon said descending slope of vertices of said V-shaped support members of said rack, and whereby said pan having a plurality of points of contact where it seats upon said rack, said pan rests stably and securely in said rack, and whereby said pan having a plurality of upward extrusions elevated above the planar bottom of said pan, a food item cooking in said pan is elevated above and spaced healthily apart from run-off fat during the cooking process, and whereby said pan having a downward sloping bottom section under said upward extrusions, and having a food item placed upon said upward extrusions above said planar bottom wall of said pan during the cooking process, run-off fat and cooking liquids flow down and forward into said well where they are isolated and segregated from said cooking food, and whereby said run-off fat and cooking liquids are isolated and segregated in a delimited portion of said pan, said fat and cooking liquids are easily accessible by basting brush or basting tube for basting purposes, and whereby said well isolates and collects run-off fat and liquids in a delimited portion of said pan, said pan need not be hazardously tilted to obtain sufficient amounts of said run-off fat and cooking liquids for basting purposes, and whereby said well enables efficient basting, thus an oven door need be kept open a minimal amount of time thereby conserving energy, and whereby a cook may grasp said handles to move said pan safely and securely.

9. The pan of claim 8 wherein said pan is made of thin-gauge metal, e.g., aluminum, affording disposability.

10. The pan and rack of claim 8 wherein said plurality of V-shaped support members of said rack and said plurality of pairs of parallel, spaced-apart, hollow upward-extrusions of said pan are both angled forward by a predetermined amount to form a V-angled shape or herringbone pattern when said plurality of V-shaped support members and said plurality of upward extrusions are viewed from above, and having said plurality of V-angled pairs of parallel, spaced-apart, hollow upward-extrusions seating stably and securely in this disposition on said shoulders of said plurality of V-angled V-shaped support members of said rack.

11. The pan of claim 8, wherein said sump or well occupies a predetermined portion that is less than the full width of said pan.

* * * * *